J. E. HEIMERL.
HEATED RECEPTACLE FOR MEALS.
APPLICATION FILED JULY 6, 1915.
1,185,664.
Patented June 6, 1916.
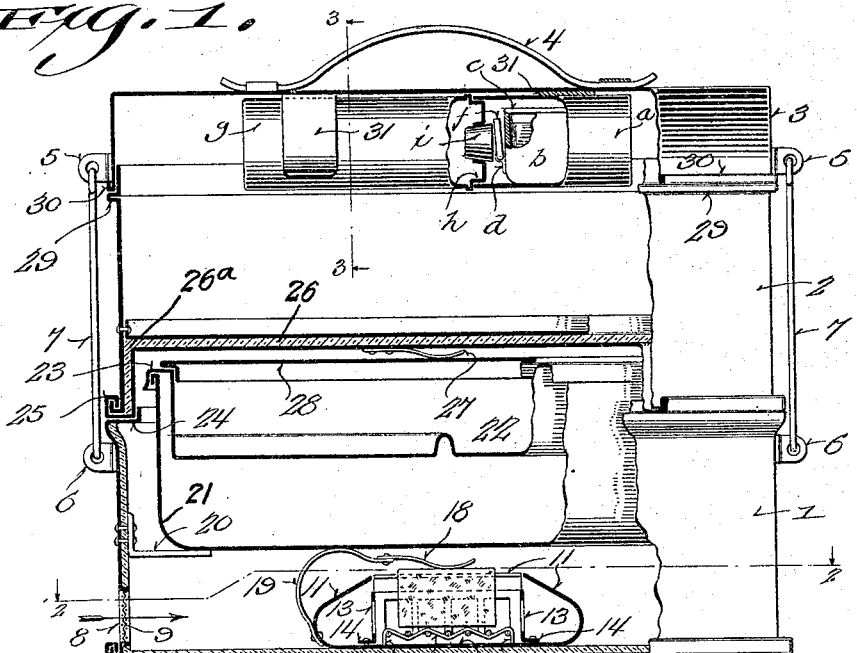
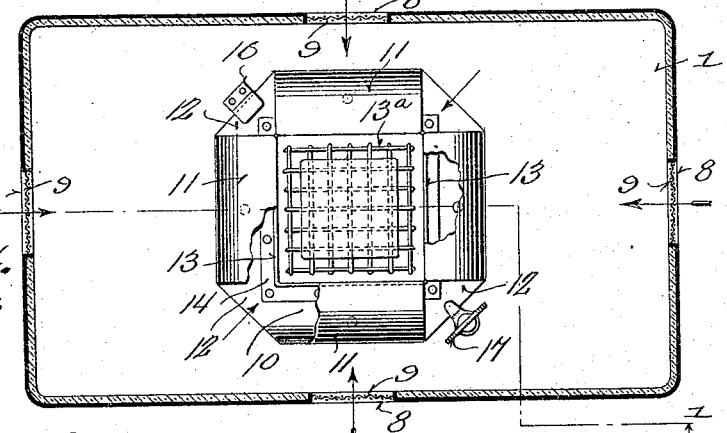
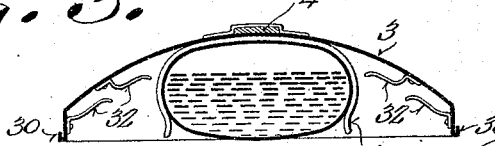

UNITED STATES PATENT OFFICE.

JULIUS E. HEIMERL, OF MILWAUKEE, WISCONSIN.

HEATED RECEPTACLE FOR MEALS.

1,185,664. Specification of Letters Patent. Patented June 6, 1916.

Application filed July 6, 1915. Serial No. 38,294.

*To all whom it may concern:*

Be it known that I, JULIUS E. HEIMERL, a citizen of the United States, and resident of Milwaukee, in the county of Milwaukee and State of Wisconsin, have invented certain new anl useful Improvements in Heated Receptacles for Meals; and I do hereby declare that the following is a full, clear, and exact description thereof.

This invention relates to the subject of meal buckets, and the primary aim of the invention is to produce a bucket of the character described that is compact in structure, comparatively light in weight, and of large capacity and is provided with simple means whereby the contents of the bucket may be retained in a heated condition indefinitely.

The invention contemplates the provision of a receptacle that is formed in sections that are readily separable and when assembled form a compact structure that is of great utility in connection with lunches, dinners and the like, and being of such a nature that it is equally adapted for use as a lunch kit as a part of motor vehicle equipments, or as a dinner pail for workmen.

One simple and practical embodiment of the invention is shown in the accompanying drawing, wherein—

Figure 1 is a vertical longitudinal sectional view of the improved dinner receptacle, the view being taken substantially on the line 1—1, Fig. 2. Fig. 2 is a transverse vertical sectional view taken on the line 2—2, Fig. 1. Fig. 3 is a detail vertical sectional view taken on the line 3—3, Fig. 1. Fig. 4 is a detailed view of one of the dishes or utensils adapted to be used with the receptacle.

The improved self-heated dinner receptacle comprises in its general organization a base section 1, an upper section 2, and a cover section 3, the latter section being provided with a handle 4 and at suitable points thereon, said cover section is provided with external laterally projecting ears 5 that may be detachably connected to similar ears 6 projecting from the base section 1 by means of the hooks or latches 7.

The base section 1 includes metallic bottom and side and end walls lined with suitable insulating material, and said walls are provided with lower openings 8 for the admission of air, the openings being provided with screens 9 formed of fine mesh material to prevent dirt and the like entering the base section. Centrally the bottom of the section 1 has a plate 10 seated thereon, said plate having four outwardly projecting portions that are rounded outwardly and inclined upwardly and inwardly to form fire shields 11, the ends of the shields being relatively disposed and spaced so that at four corners of the plate 10 air admitting openings or passages 12 are formed. Within the space formed by the shields 11 a fire chamber is formed, this chamber including the centrally apertured upstanding walls 13 which have the outwardly projecting base flanges 14 that are riveted or otherwise fastened to the plate 1. Within the chamber 13 is a grate 13ª preferably formed of screen material having downturned edge portions forming supports 15 that retain the grate in spaced relation to the plate 10. The plate 10 is removably held in position in the center of the base section 1 by means of the spring clip 16 that engages the bottom of one of the air passages 12, and a clamp 17 that is manipulated by means of a thumbscrew and which engages a diagonally opposite bottom of an air passage, as is shown in Fig. 1 of the drawing.

The burner described is adapted for the use of charcoal as the fuel, and such fuel is held to the grate by means of a curved finger extension carried by a spring arm that is bowed and extends from one of the shields 11. The connection between the finger 18 and its supporting arm 19 may be a pivotal one so that said finger may be swung away from the fuel when desired or necessary. Above the burner, the section 1 is provided with supporting ledges 20 for a utensil of the dish type, designated by the numeral 21, and said ledges are preferably in the form of brackets suitably attached to the inner surfaces of the walls of the section 1 and having horizontally projecting portions upon which the utensil seats. It will be observed by reference to Fig. 1 of the drawings that when the utensil 21 is seated on the ledges 20 its bottom depresses the bowed arm 19 so that the finger 18 is caused to clamp the fuel to the burner. This manner of holding the fuel is of special advantage when charcoal is the fuel used as such prevents the fuel being scattered or shaken from the burner when the receptacle is being transported.

The utensil 21 has a cover in the form of a smaller utensil or dish 22 having an outwardly projecting flange portion 23 that engages over the upper edge of the utensil or dish 21, and serves to both form a cover for the utensil or dish 21 and also to hold the two dishes in nested engagement.

The upper edge of the base section 1 is formed with a flat inwardly projecting flange 24 forming a seat that is engaged by the surrounding base flange 25 of the concaved bottom 26 of the upper section 2. The base flange of the section 2 is projected outwardly, and the walls of the section which extends below the plane of the bottom as well as the bottom itself are lined with suitable insulating material as at 26$^a$. Said bottom 26 of the upper section 2 carries a spring clip arm 27 that bears on the cover 28 of the utensil or dish 23 and thereby holds said cover in position when the sections 1 and 2 are assembled.

Adjacent its upper edge, section 2 of the receptacle is provided with an outwardly projecting flange 29 that forms a seat for the base flange 30 of the concaved cover section 3. Centrally within the cover and arranged in suitably spaced alinement are U-shaped spring clips 31 adapted for holding bottles and the like, and adjacent said clips 31, other and smaller spring clips 32 are provided for holding knives, forks, spoons and the like.

The sections 1, 2 and 3 of the receptacle are preferably formed of suitable material that is both strong and light, such as aluminium, and their flanges may be formed by suitably bending the material. The sections when assembled, are held in rigid relation by means of the side latches 7, the latches being of a type that can be readily released when it is desired to separate the sections to give access to the contents of the same.

By reference to Figs. 1 and 2 of the drawings, it will be seen that the openings 8 of the base section 1 are so arranged relatively to the shield 11 of the burner, that the incoming air through said openings, is deflected by and between said shields and enters the burner through the passages 12. This arrangement prevents the incoming air having a blowing action of cold air on the fire that would tend to render the intensity of the fire irregular. In addition the shields also serve the purpose of reflecting the heat back onto the base of the charcoal and thereby increase the intensity of the fire. It will also be observed that the guards or shields 11 and the walls of the fire chamber 13 prevent the fuel being shaken from the burner, such holding of the fuel being materially assisted by the clamping action of the finger 18.

Fig. 4 of the accompanying drawings, taken in connection with Fig. 1, illustrates a convenient form of dish or utensil that can be compactly stored within a cup or the like carried by one of the clips 31, the cup designated by the character $a$ may be a drinking cup cylindrical in shape, and within the cup a jar or the like $b$ is stored. The jar may be provided with a cover $c$ and at one end is provided with a hinge ear $d$ carrying a bar $e$ having angular ends $f$ that serve as supporting legs for the jar, as suggested in Fig. 4, as well as finger grips to facilitate removing the jar from the cup $a$. When one of the clips 31 is used as a holder for a bottle $g$, it will be seen that the neck $h$ of the bottle telescopes with the open end of cup $a$ and that the stopper $i$ of the bottle holds the supporting legs $f$ in positions to form finger grips.

I claim as my invention:—

1. In a dinner pail or the like, the combination with a main receptacle of a burner grate carried therein and means adapted to be actuated by a receptacle in the main receptacle for holding fuel to the grate.

2. In a dinner pail or the like, the combination with a receptacle of a burner grate supported therein, a spring finger upwardly bowed and extending over the grate and means in said receptacle for supporting a utensil in such manner as to actuate the spring member to press and hold fuel to the grate.

3. In a dinner pail or the like, the combination with a receptacle of a burner member including a plate, spaced edge portions of the plate being bent upwardly, a burner chamber including upstanding walls secured to the plate and provided with apertures adjacent the intermediate portions of the upturned edges of the plate and means for detachably securing the plate to the bottom of the receptacle.

4. In a dinner pail or the like, the combination with a receptacle of a burner member including a plate, spaced edge portions of the plate being bent upwardly, a burner chamber including upstanding walls secured to the plate and provided with apertures adjacent the intermediate portion of the upturned edges of the plate, means for detachably securing the plate to the bottom of the receptacle, and a spring arm secured to the plate and bowed with its free end disposed over the burner chamber and adapted to resiliently hold fuel in the chamber upon being engaged by a utensil in the receptacle.

5. In a dinner pail or the like, the combination with a main receptacle of means carried therein for supporting a second receptacle, a cover for the second receptacle, a cover for the main receptacle, and means carried by the cover of the main receptacle for resiliently engaging the cover of the second receptacle to hold it and the said receptacle against displacement.

6. In a dinner pail or the like, the combination with a supporting wall of a pair of spring clips carried thereby, members adapted to be carried by said clips and the adjacent ends of said members being adapted to engage in telescoping relation.

7. In a dinner pail or the like, the combination with a supporting wall of a pair of U-shaped spring clips carried thereby, a bottle member adapted to be carried by one clip and a cup member adapted to be carried by the other clip, and the adjacent end of the bottle being adapted to telescope within the mouth of the cupped member whereby they are held in axial alinement.

8. In a dinner pail or the like, the combination with a supporting wall of a pair of U-shaped spring clips carried thereby, a bottle member including a stopper adapted to be carried by one clip and a cup member adapted to be carried by the other clip, the stopper end of the bottle being adapted to telescope within the mouth of the cup member whereby they are held in axial alinement, a member adapted to be disposed within the cup member, and the stopper of the bottle member being adapted to engage and hold said last member against undesired movement within the cup.

In testimony that I claim the foregoing I have hereunto set my hand at Milwaukee, in the county of Milwaukee and State of Wisconsin, in the presence of two witnesses.

JULIUS E. HEIMERL.

Witnesses:
H. JOSEPH DOYLE,
M. E. DOWNEY.

Copies of this patent may be obtained for five cents each, by addressing the "Commissioner of Patents, Washington, D. C."